UNITED STATES PATENT OFFICE.

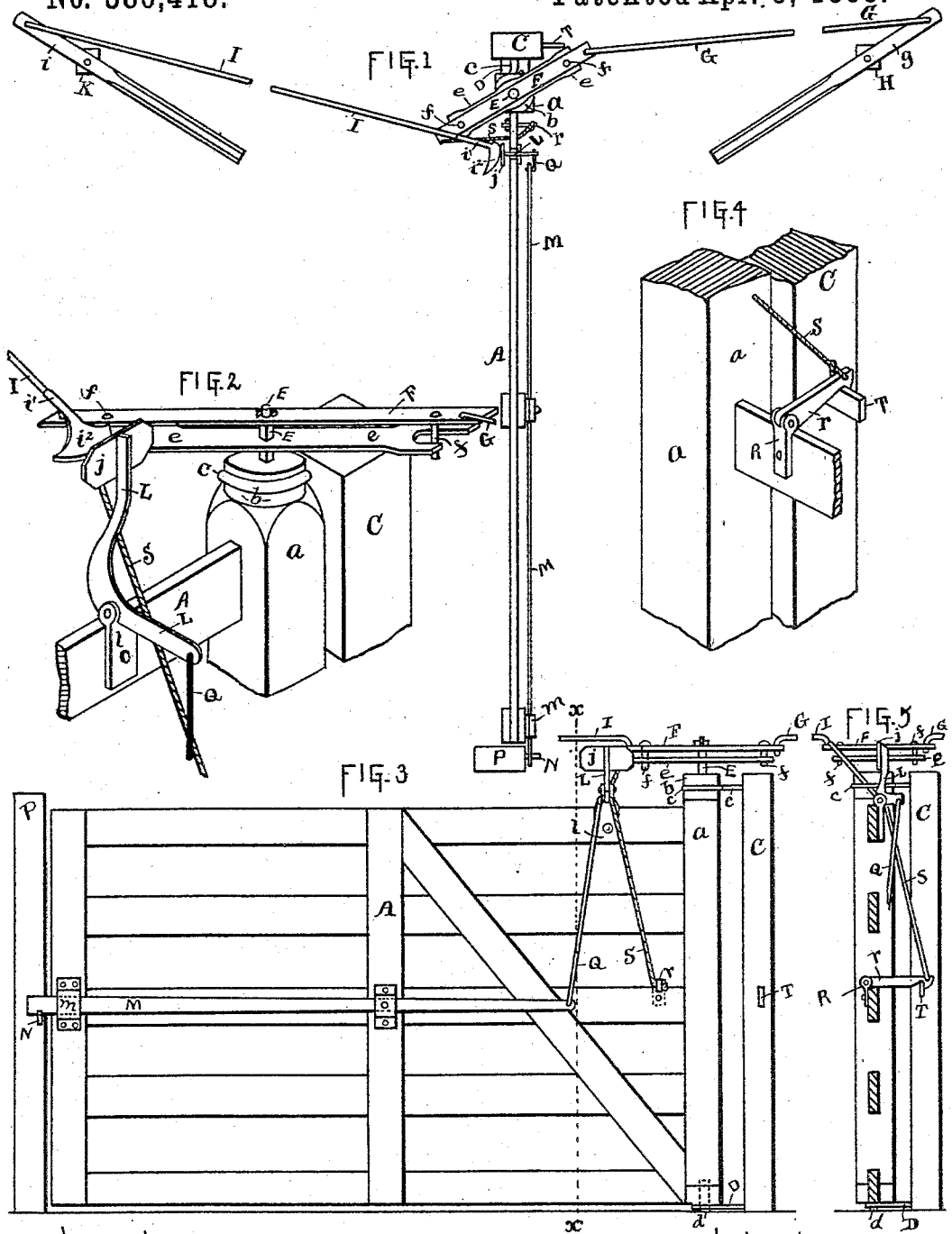

JOHN W. BARNHARD AND DAVID H. BARNHARD, OF NEW ALBANY, ASSIGNORS OF ONE-HALF TO ELMER E. ANDERSON, OF HARLEM, OHIO.

GATE.

SPECIFICATION forming part of Letters Patent No. 380,418, dated April 3, 1888.

Application filed December 29, 1887. Serial No. 259,311. (No model.)

*To all whom it may concern:*

Be it known that we, JOHN W. BARNHARD and DAVID H. BARNHARD, citizens of the United States, residing at New Albany, in the county of Franklin and State of Ohio, have invented a certain new and useful Improvement in Gates, of which the following is a specification.

Our invention relates to the improvement of what is known as "automatic" gates, and has particular relation to farm-gates.

The objects of our invention are to combine with a gate simple and effective mechanism by means of which the gate may be opened and closed by a person passing therethrough without the necessity of dismounting or stopping to close the gate; to so construct said mechanism as to admit of the movement of the gate being controlled by the operating-lever, thus admitting of its being but partially opened and closed, if desired, and to so construct said mechanism as to enable the operator to first unlatch the gate and then move it by one motion of the lever, and to combine in said gate and its operating mechanism strength and durability of the parts. These objects we accomplish in the manner illustrated in the accompanying drawings, in which—

Figure 1 is a plan view of the gate and its operating mechanism, showing the gate closed. Fig. 2 is a perspective view of the main portion of the gate-moving mechanism. Fig. 3 is a side elevation of the gate. Fig. 4 is a perspective view in detail of the means for latching the gate in an open position; and Fig. 5 is a sectional view of the gate when open, taken on line $x\,x$ of Fig. 3.

Similar letters refer to similar parts throughout the several views.

A represents a farm-gate, of the ordinary form, having its rear frame-piece, $a$, provided with a metallic band, $b$, made to fit tightly about the upper end.

C represents the rear gate-post, to which is hinged or pivoted the gate A by means of a bearing-arm, $c$, in the form of a screw-eye made to project outwardly from the front face of the post C, the ring on the outer end of said arm $c$ being made to encircle loosely the band $b$ of the post $a$. The lower end of the upright $a$ is provided with a downwardly-extending pivot-pin, $d$, which enters and is adapted to turn within a hole formed in a bearing-plate, D, made to project from the front face of post C, near its lower end, on which bears and turns the lower end of upright $a$.

Made to extend upwardly from the center of the top of the upright $a$, to which it is rigidly secured, is a pin, E. Rigidly secured at the center of its length to said pin E, slightly above the post, is an arm, $e$, having each of its ends forked, as shown. The pin E is provided above the arm $e$ with a shoulder, above which is loosely pivoted an upper arm, F, somewhat longer than the arm $e$. This arm F is provided on its underside, a short distance from each of its ends, with a downwardly-extending pin, $f$, said pins being made to extend between the forked ends of the arm $e$.

To the rear end of the pivoted arm F is pivoted one end of a rod, G, said rod extending outwardly and being pivoted at its remaining end to the rear end of a hand-lever, $g$, pivoted at about the center of its length to the top of a post, H. The post H is located at a convenient distance from and opposite one side of the post C. Pivoted to the front end of the arm F is one end of a rod, I, said rod having its remaining end pivoted to the rear end of a hand-lever, $i$, pivoted, as described for the lever $g$, to the top of a post, K, said post being located on the opposite side of the post C from post H and in line therewith. The inner end of the rod I is provided beyond its connection with the arm F with an extension, $i'$, said extension having an enlarged head, $i^2$. The head $i^2$ is adapted to bear against a plate, $j$, supported on the upper end of the upwardly-extending arm of a bell-crank lever, L, the latter being pivoted at its angle within the upper end of a bearing-plate, $l$, which is secured to and made to project upwardly from the top board of the gate A.

M represents a latch-bar pivoted slightly in rear of the center of its length to the central portion of the gate-frame, which, being made to pass through a keeper, $m$, secured to the side of the forward end of the gate, has its outer end adapted to rest within a notch formed in a metallic catch-lug, N, projecting from the front gate-post, P. The rear end of the latch-bar M is connected with the lower arm of the bell-crank lever L by means of a rod, Q, having its ends pivoted, respectively, to the lever and latch.

Secured to one of the gate-slats, at a point below the lever L and on the side opposite the latch-bar, is an upwardly-projecting plate, R, to the upper end of which is pivoted or hinged a short latch-arm, $r$, which, projecting between the slats of the gate, is provided near its outer end with a shoulder or notch on its under side. This latch-arm $r$ is connected with the front portion of the lever-arm F by means of a suitable cord or chain, S.

T represents a catch-arm, made to project from the side of the post C.

The operation of our improved gate is as follows: Approaching the gate from either direction, the handle of lever $g$ or $i$ may be moved, causing, through the rod G or I, a movement of the arm F, and at the same time a pressure of the head $i^2$ of the rod-extension $i'$ against the top plate, $j$, of the lever L. This pressure against the plate $j$ will, through the lever L and rod Q, cause the rear end of the latch-bar M to lower, thus raising its front end out of the catch N. This operation completed, it will be seen that each of the pins $f$ has traveled a sufficient distance within the fork of the corresponding end of the arm $e$ to cause it to come into contact with and press against the inner side of one of the forks. This pressure, as will be seen, will operate through the arm $e$ and pin E to open the gate outward. By a continued pull on the lever-handle G or I the movement of the gate may be continued until the beveled outer end of the latch $r$ slips over and allows its shoulder to engage with the catch-arm T, as shown in detail in Fig. 4 of the drawings. Having passed through the gate, it will be seen that pulling on the remaining handle of the lever will produce a reverse motion of the arms F and $e$, the former by its first movement causing, through cord S, the latch $r$ to be elevated out of engagement with catch T. The gate may then be closed, the latch-bar being elevated, in the manner above described, when near the front post, P, and allowed to drop into its position in the catch N.

It will be observed that by the construction and operation above described the movement of the gate is controlled entirely by the lever-handles, and that the gate may be held partially open, if desired.

Having now fully described our invention, what we claim, and desire to secure by Letters Patent, is—

1. In the above-described gate, the combination of gate A, hinged to post C, having latch $r$, and having its rear frame-post, $a$, provided with pin E, the fixed forked lever $e$, and pivoted lever F, (the latter having pins $f$,) with the pivoted rods G and I and pivoted levers $g$ and $i$, substantially as and for the purpose specified.

2. The combination of the gate A, hinged to post C, bell-crank lever L, and pivoted latch M, connected by rod Q, frame-post pin E, fixed forked lever $e$, and pivoted lever F, (the latter having pins $f$,) with the rods G and I, the latter having extension $i^2$ and pivoted operating-levers $g$ and $i$, substantially as and for the purpose specified.

3. The combination of the gate A, hinged to post C, the latter having catch T, bell-crank lever L, and pivoted latch M, connected by rod Q, pivoted latch $r$, connected with arm F by cord S, frame-post pin E, fixed forked lever $e$, and pivoted lever F, (the latter having pins $f$,) with the rods G and I, the latter having extension $i^2$ and operating-levers $g$ and $i$, all arranged and adapted to be operated substantially as and for the purpose specified.

JOHN W. BARNHARD.
DAVID H. BARNHARD.

In presence of—
R. B. ALBERY,
B. M. ALBERY.